No. 819,184. PATENTED MAY 1, 1906.
W. THORNTON.
ANTIFRICTION BEARING.
APPLICATION FILED OCT. 20, 1904.
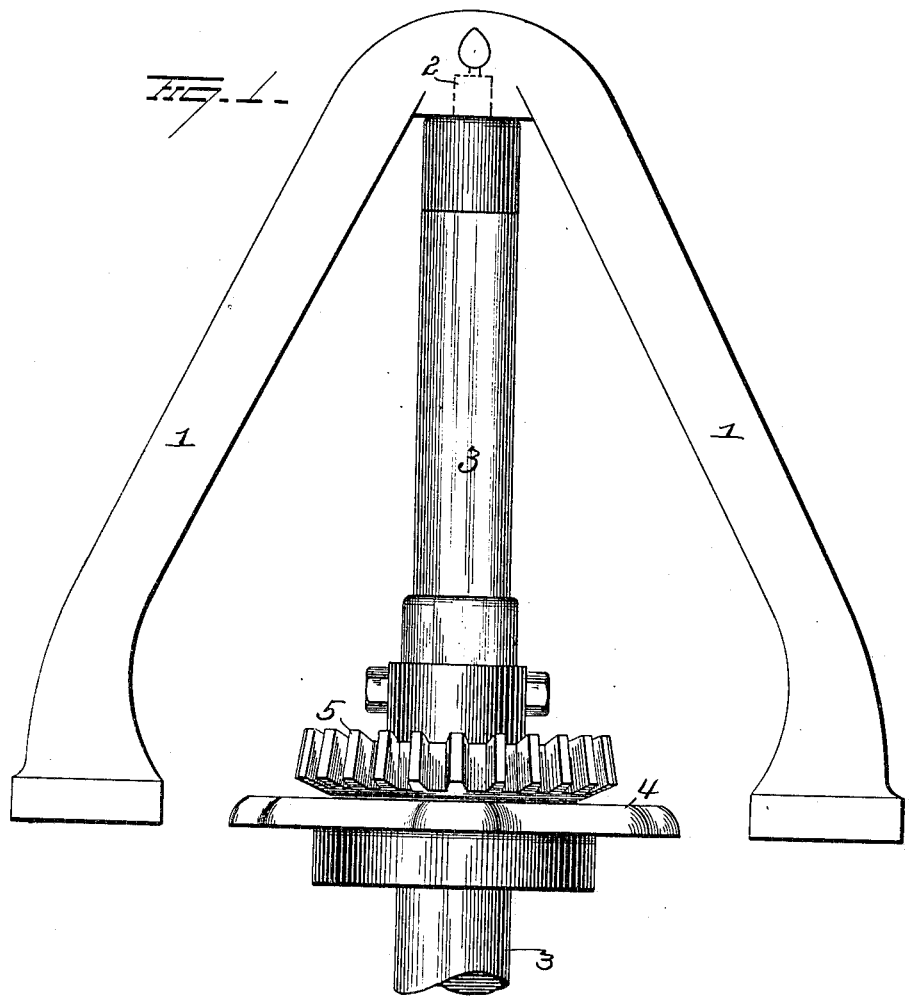
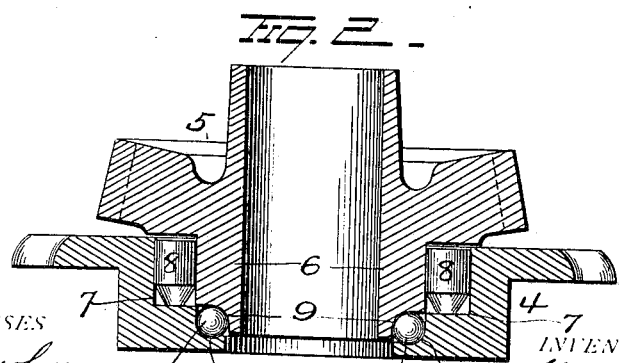
WITNESSES
E. Nottingham
G. F. Downing
INVENTOR
W. Thornton
By H. A. Seymour
Attorney

UNITED STATES PATENT OFFICE.

WILLIAM THORNTON, OF CHATTANOOGA, TENNESSEE.

ANTIFRICTION-BEARING.

No. 819,184. Specification of Letters Patent. Patented May 1, 1906.

Application filed October 20, 1904. Serial No. 229,292.

*To all whom it may concern:*

Be it known that I, WILLIAM THORNTON, a resident of Chattanooga, in the county of Hamilton and State of Tennessee, have invented certain new and useful Improvements in Antifriction-Bearings; and I do hereby declare the following to be a full, clear, and exact description of the invention, such as will enable others skilled in the art to which it appertains to make and use the same.

My invention relates to an improved antifriction-bearing, the object of the invention being to provide improvements of this character especially adapted for use in connection with gearing on washing-machines, although it may be put to various other uses; and the invention consists in certain novel features of construction and combinations and arrangements of parts, as will be more fully hereinafter described, and pointed out in the claims.

In the accompanying drawings, Figure 1 is a view in elevation, illustrating my improvements applied to the gear of a washing-machine; and Fig. 2 is a view in vertical section of the gear and bearing.

1 represents a frame to be fixed to a washing-machine and providing a thrust-bearing for a contracted trunnion 2 at the upper end of a vertical dasher rod or shaft 3.

4 represents a bearing-ring adapted to rest in an opening in the washing-machine top, (not shown,) and 5 is a gear secured on the shaft or rod 3 and to which motion is transmitted in any desired manner to turn or reciprocate the rod or shaft 3. The gear 5 has a cylindrical depending portion 6 projecting into ring 4, which latter is made with an annular recess 7 to receive a series of rollers 8, located between the cylindrical portion 6 of the gear and the vertical wall of recess 7, and the lower ends of these rollers 8, which rest on the horizontal or bottom wall of recess 7, are contracted to reduce friction. The lower end of the cylindrical portion 5 of the gear is made with a curved groove or runway 9, and the ring 4 has a similar runway 10, between which a series of balls 11 is mounted.

By constructing my improvements as above explained it will be seen that the balls 11 sustain any downward strain, and rollers 8 sustain the lateral strain, relieving the parts of frictional contact both vertically and laterally and resulting in an extremely easy-running bearing in which friction is reduced to a minimum.

Having fully described my invention, what I claim as new, and desire to secure by Letters Patent, is—

1. An antifriction-bearing comprising a fixed member having an annular recess therein, a rotary member provided with a cylindrical portion mounted in said recess, elongated rollers in said recess between the members having contracted ends seated upon the base of the recess in the fixed member, and means for sustaining the rotary member free of the other ends of the elongated rollers.

2. An antifriction-bearing comprising a fixed member having an annular recess and a groove below said recess, a rotary member having a cylindrical portion mounted in said recess and provided with a groove at its lower end, elongated rollers in the recess surrounding the cylinder and balls mounted in the grooves in the fixed member and the cylindrical portion of the rotary member and sustaining the rotary member free of the upper ends of the elongated rollers.

3. An antifriction-bearing comprising a fixed ring having an annular recess and a groove below said recess, a rotary member having a cylindrical portion disposed within said fixed member and having a groove at its lower end, elongated rollers in said recess between the cylindrical portion of the rotary member and the vertical wall of the recess, said rollers having contracted ends supported upon the bottom of the recess, and balls mounted to run in the grooves in the cylindrical portion of the rotary member and the ring and sustaining the rotary member free of the elongated rollers.

4. In a device of the character described, the combination with a frame, a vertical shaft having a bearing at one end in the frame, a rotary member secured on the shaft, said rotary member having a cylindrical depending portion provided at its lower end with a groove, a fixed ring having an annular recess, and also having a groove below the recess, elongated rollers mounted in said recess, and balls mounted in the grooves in the fixed ring and the cylindrical portion of the fixed member and sustaining the rotary member free of the upper ends of the elongated rollers.

In testimony whereof I have signed this specification in the presence of two subscribing witnesses.

WILLIAM THORNTON.

Witnesses:
 JOHN M. KERREY,
 VICTOR CAMPBELL.